Oct. 24, 1939.   A. STEIN   2,177,337
AUTOMATIC ILLUMINATED GLASS HOLDER
Filed Nov. 20, 1937
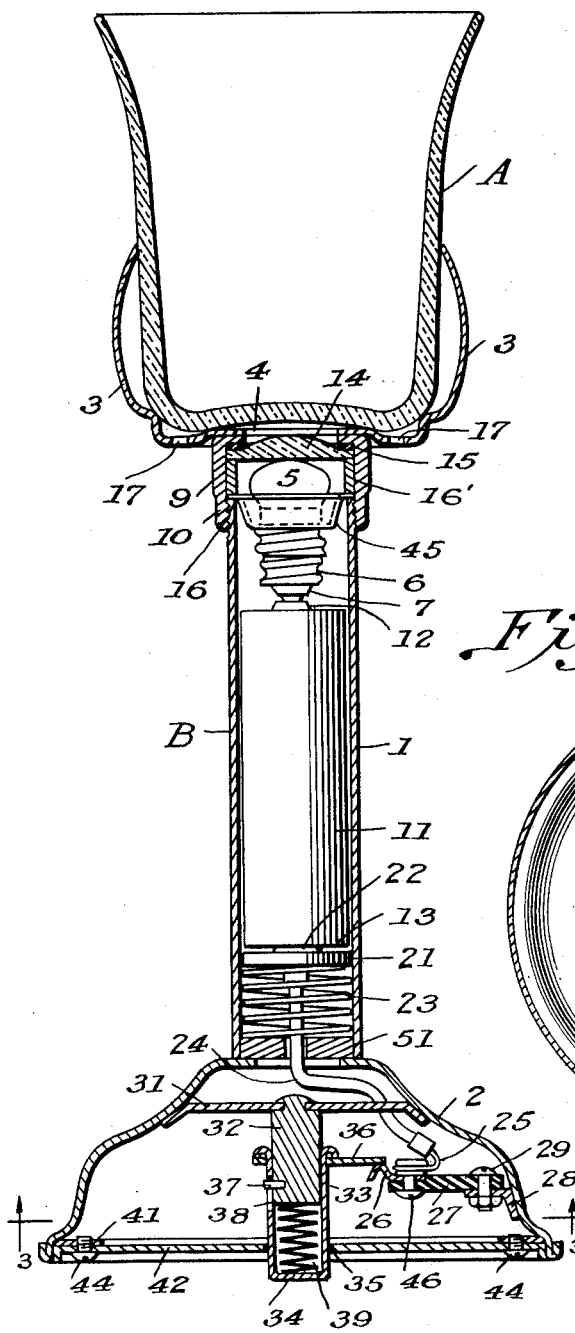
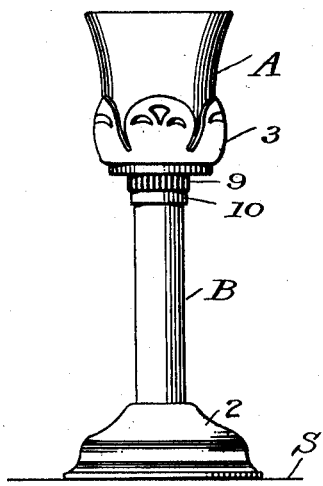
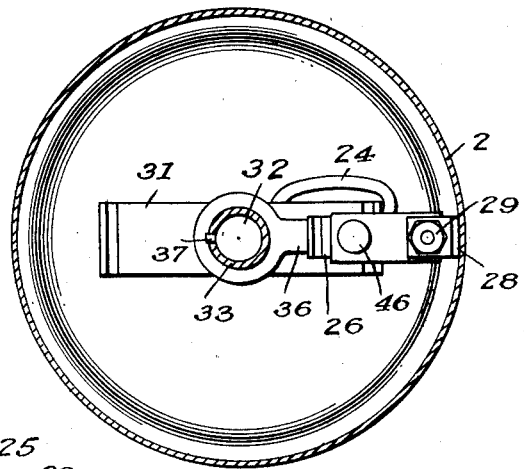
Inventor
ALEXANDER STEIN
By Samuel Felnritz
Attorney Patented Oct. 24, 1939

2,177,337

UNITED STATES PATENT OFFICE 2,177,337

AUTOMATIC ILLUMINATED GLASS HOLDER

Alexander Stein, Ventnor, N. J.

Application November 20, 1937, Serial No. 175,703

5 Claims. (Cl. 240—6.4)

This invention relates to a holder for light-permeable receptacles such as glasses and more particularly to such as are illuminated automatically for the puropse of obtaining novel lighting effects in the course of their use.

The present invention proceeds upon the principle of illumination of light-permeable receptacles by the provision of a small electric lamp disposed in the upper end of a holder therefor for the purpose of illuminating the base of the receptacles and the contents thereof to obtain novel utilitarian and ornamental display effects. The invention finds particular application in the use of such lighting expedients in the course of serving and drinking sparkling beverages such as ginger ale, champagnes, beer, or colored beverages such as wines, liqueurs, liquors, cocktails and the like. In the preferred embodiment of the invention the illumination of the receptacles is accomplished automatically by the raising of the receptacles and the holders therefor for the purpose of serving and consumption while the placement of the holders upon a supporting table serves to extinguish the illumination. Highly colorful effects can thus be obtained in dimly lighted night clubs and cabarets and other places of amusement and recreation.

Furthermore the invention may find useful application in hospitals and other places where lighting is cut down at certain times, and in which nevertheless nourishing and therapeutic liquids and foods must be administered. The present invention permits individual illumination for the vessels to be had at the time when the consumption thereof requires it, while eliminating the illumination during idle periods. The novel effects attainable by the present invention also may be utilized as an inducement for children or invalids to each such foods as otherwise would be unsavory to them, for example such foods as colored gelatines, milk and the like which may be served in light-permeable receptacles in order to obtain the advantages of the present invention.

It is an object of the invention to provide a rugged holder for receptacles, tumblers, vessels and the like formed of transparent, translucent or other light-permeable materials, which holder incorporates as a part thereof an electric lamp adapted to be energized for the purpose of creating novel lighting and display effects, to enhance the appearance of the substances contained in the receptacles, and to furnish illumination in the course of consumption of these substances.

It is a further object of the invention to provide a holder for light-permeable receptacles which may be illuminated automatically in response to predetermined positions of the holder.

It is a further object of the invention to provide an automatically illuminated glass holder having an attractive appearance which lends itself to easy interchangeability for the purpose of accommodating several forms of receptacles of different sizes and shapes.

It is a further object of the invention to provide a holder for light-permeable receptacles composed of a base, a shaft portion extending upwardly therefrom and a frame connected to the upper end of the shaft portion adapted to receive the glass receptacle, which holder is fitted with an electric lamp at the upper end of the shaft portion at the base of the frame which is designed to be energized by an electric battery included in the assembly in response to the actuation of a switching device incorporated in the base of the holder in relation to a support upon which the holder is placed.

Other objects and purposes will appear from the more detailed description of the invention following hereinafter taken in conjunction with the accompanying drawing, wherein:

Figure 1 is a longitudinal sectional view of a preferred embodiment of my invention, Figure 2 is a front elevation thereof, and Figure 3 is a transverse sectional view along line 3—3 of Figure 1.

In Figure 1 is shown a glass receptacle or tumbler A adapted to receive liquid or solid substances and to be retained in a holder B which is composed essentially of a main shaft portion 1, a base portion 2 and an upper frame portion 3. The receptacle A may be formed of any light-permeable material which may be transparent, translucent, clear or colored. In the preferred embodiment of the invention, the frame 3 may have a flanged extension 9 extending therebelow detachably connected to the threaded upper extremity 16 of the main shaft portion 1. Such a construction permits the easy and convenient detachability of frame retainer 3 adapted to accommodate vessels or receptacles A of various sizes and shapes. The arms of the frame 3 preferably have a slight resilience in order to yieldingly engage the receptacle A so that the latter may not be dislocated accidentally therefrom without a positive removal thereof.

The frame 3 is formed with an aperture 4 centrally thereof through which is adapted to shine the light emitted from an electric lamp 5 disposed at the upper end of the shaft portion and below the base of the receptacle A. The electric lamp 5 is energized by a self-contained battery 11 disposed in the hollow shaft 1 which is connected in circuit with the lamp in the manner described below. In order to exclude any leakage of moisture arising from condensation on the exterior of the glass into the lighting assembly, apertures 17 are provided at the bottom of the frame 3 to permit the passage of the moisture. Furthermore, a sealing gasket 15 may be provided between the flanged extension 9 and the light assembly to assure a liquid-tight unit.

The light emitted from the lamp 5 may be made to shine through a glass shield plate 14 which may be clear. If desired, the glass shield 14 may be colored to modify the light effects thrown upon the base of the receptacle and the contents therein.

My invention finds particular application in the serving and consumption of colored liquids such as ginger ale, champagne, wines, liquors and the like, whereby distinctive ornamental and display effects may be obtained by an intermittent lighting and extinguishment of the light thrown into the glass receptacles for the liquids whereby color and novelty are lent to gay parties and gatherings, such as cabarets and the like. For the attainment of this feature provision is made of a switch device which may be disposed within the base of the holder 2 for breaking the circuit of the battery 11 and the electric lamp 5 when the holder is resting on a table or other support while the lifting of the holder in the course of serving or drinking serves to illuminate the light-permeable vessel and the contents therein. In the illustrated embodiment of the invention the circuit making and breaking arrangement comprehends the use of a button spring cylinder switch 33 which is designed to normally make contact between contacts 26 and 36 when the holder is removed from a support S therefor. On the other hand, the mere disposition of the holder and receptacle on the support S serves to break the electrical contact between terminals 26 and 36 by the effect of its own weight.

In order to simplify the construction in accordance with the present invention, the holder and base as well as the retaining frame 3 may be formed of metallic material which may be chromium plated or finished in any other manner for purposes of ornamentation. The socket 45 for the electric lamp 5 is disposed upon the upper edge of the shaft 1 and is spaced from the rest of the assembly by an intermediate washer 16'. The shell 6 of the lamp makes threaded contact with the socket and this terminal of the lamp is connected to the casing of the battery at 13 through the circuit of the metallic frame of the shaft 1 and base 2. This circuit is normally made through a metallic cross-bar 31 disposed in the base 2 upon which is mounted the cylinder switch mentioned above. The bar 31 has attached thereto a cylinder 32 on which the hollow cylindrical sleeve 33 is reciprocable. A spring 39 operating between parts 32 and 33 serves to maintain the contact 36 in its lowermost position as shown at Figure 1. The contact 36 is rigidly attached to the sleeve 33 in any desired manner. The outward movement of the sleeve 33 with respect to the cylinder 32 is limited by a pin 37 on 32 operating in conjunction with a slot 38 of limited length in the sleeve 33. The contact 26 cooperating with contact 36 is mounted on a fiber mounting 27 by means of a rivet or bolt and nut assembly 46. The fiber mounting may be mounted on the inside of the base 2 by a bolt and nut assembly 29 attached to the lug 28 which may be soldered to the inside of the base 2. A terminal 25 is provided at the end of an insulated wire 24 for connection to the contact 26. The insulated wire passes upwardly through an apertured disc 51 at the base of the shaft portion and is connected with a metallic button disposed above an insulating washer 21, which washer is maintained in close engagement with the base 13 of the battery 11 by the action of a spiral spring 23 operating between the elements 51 and 21. Furthermore, the spring 23 serves the function of maintaining the positive terminal 12 of the battery in close engagement with the tip of the electric lamp 7.

With the parts in the position shown in Figure 1, a circuit is completed through the electric lamp across the contacts 26 and 36. However, when the holder and vessel are placed upon a table support, the bottom 34 of the cylinder sleeve projects below the edge of the base with the result that in the position shown in Figure 2, the sleeve 33 travels upwardly to separate the contact 36 from contact 26 thereby breaking the electric circuit of the lamp.

A circular plate 42 may be detachably connected to enclose the switch mechanism in the base of the holder by engagement with lugs or an annular rim 41 arranged interiorly thereof into which may be fitted threaded screws 44. Of course a central aperture 35 is provided in the center of the base for permitting the easy movement of the sleeve 33.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claims.

What I claim is:

1. A footed holder for a glass receptacle comprising a base and a hollow shaft portion extending upwardly therefrom, a frame detachably connected to the upper end of said shaft portion adapted to resiliently retain the glass receptacle therein, an electric lamp at the upper end of the said shaft portion at the base of said frame, a dry cell battery in said shaft portion for energizing said lamp, and a switching device in the base of said holder for connecting said electric lamp in circuit with said battery comprising a member extending below the base adapted to break the circuit of said battery and electric lamp through said switching device in response to the positioning of the holder upon a support and the consequent inward movement of said member into said base.

2. A metallic holder for a glass receptacle comprising a base and a shaft portion extending upwardly therefrom, a metallic frame detachably connected to the upper end of said shaft portion adapted to resiliently retain the glass receptacle therein, an electric lamp at the upper end of said shaft at the base of said frame, a dry cell battery in said shaft portion for energizing said lamp, and a switching device in the base of said holder for connecting said electric lamp in circuit with said battery comprising a member extending centrally below the base adapted to break the circuit of said battery and electric lamp through said switching device in response to the positioning of the holder upon a support and the consequent inward movement of said member into said base.

3. A metallic holder for a glass receptacle comprising a base and a shaft portion extending upwardly therefrom, a metallic frame detachably connected to the upper end of said shaft portion adapted to resiliently retain the glass receptacle therein, an electric lamp at the upper end of said shaft at the base of said frame, a dry cell battery in said shaft portion for energizing said lamp, a glass screen at the upper end of said shaft portion for sealing the lamp and battery from the glass receptacle, and a switching device in the base of said holder connecting said electric lamp in circuit with said battery comprising a member extending below the base adapted to break the circuit of said battery and electric lamp through said switching device in response to the positioning of the holder upon a support, and a consequent inward movement of said member into said base.

4. A holder for a glass receptacle comprising a base and a shaft portion extending upwardly therefrom, a frame detachably connected to the upper end of said shaft portion adapted to resiliently retain the glass receptacle therein and provided with apertures at the lower end thereof outside of said shaft portion, an electric lamp at the upper end of said shaft at the base of said frame, a dry cell battery in said shaft portion for energizing said lamp, a glass screen and a sealing gasket at the upper end of said shaft portion for sealing the lamp and battery from the glass receptacle, and a switching device in the base of said holder for connecting said electric lamp in circuit with said battery comprising a member extending centrally below the base adapted to break the circuit of said battery and electric lamp through said switching device in response to the positioning of the holder upon a support and the consequent inward movement of said member into said base.

5. The combination set forth in claim 2 wherein said switching device comprises a fixed metallic cylinder extending downwardly within and connected to the base, and said member is formed as a sleeve reciprocable on said cylinder, a spring between said cylinder and sleeve normally tending to maintain said sleeve below the level of the base, a fixed contact member mounted within said base and insulated therefrom, and a movable contact member cooperating with said fixed contact member attached to said sleeve adapted to make contact therewith in the extended position of said spring while breaking the contact in response to the inward movement of said sleeve and the compression of the spring.

ALEXANDER STEIN.